United States Patent [19]

Maricle et al.

[11] Patent Number: 5,001,021
[45] Date of Patent: Mar. 19, 1991

[54] CERIA ELECTROLYTE COMPOSITION

[75] Inventors: Donald L. Maricle, Glastonbury; Thomas E. Swarr, South Windsor, both of Conn.; Harry L. Tuller, Wellesley Hills, Mass.

[73] Assignee: International Fuel Cells Corporation, South Windsor, Conn.

[21] Appl. No.: 450,420

[22] Filed: Dec. 14, 1989

[51] Int. Cl.$^5$ .............................................. H01M 8/12
[52] U.S. Cl. ........................................ 429/13; 429/193
[58] Field of Search ....................... 429/31, 33, 13, 193

[56] References Cited

U.S. PATENT DOCUMENTS

| | | | |
|---|---|---|---|
| 4,686,158 | 8/1987 | Nishi et al. | 429/26 |
| 4,702,971 | 10/1987 | Isenberg | 429/31 |
| 4,851,303 | 7/1989 | Madou et al. | 429/33 |

OTHER PUBLICATIONS

Tuller, H. L. and Norwick, A. S., "Doped Ceria as a Solid Electrolyte", Journal of the Electrochemical Society: Solid State Science, vol. 122, No. 2,225 (Feb. 1975).

Ross, P. N. and Benjamin, T. G., "Thermal Efficiency of Solid Electrolyte Fuel Cells with Mixed Conduction", Journal of Power Sources 1 (1976/77).

Primary Examiner—Donald L. Walton

[57] ABSTRACT

A ceria electrolyte composition is disclosed. The composition provides high ionic conductivity and low electronic conductivity under reducing conditions. Fuel cells employing the disclosed composition exhibit improved efficiency and power density.

16 Claims, 3 Drawing Sheets

CERIA ELECTROLYTE COMPOSITION

TECHNICAL FIELD

This invention relates to solid electrolyte fuel cells and electrolytic cells and more particularly, to electrolyte compositions for use in solid electrolyte fuel cells and electrolytic cells.

BACKGROUND OF THE INVENTION

A fuel cell is a device for directly converting the chemical energy of the fuel into electrical Power. A fuel cell comprises an anode, a cathode, and an electrolyte disposed between the two electrodes.

In the operation of a typical fuel cell, fuel gas is fed to a porous anode and an oxidant gas is fed to a porous cathode. The reactant gases diffuse through the electrodes and electrochemically react to yield water, heat, and electrical energy. At the anode, the fuel gives up electrons in an electrochemical oxidation reaction. The electrical current so generated is conducted from the anode through an external circuit to the cathode. At the cathode, the electrons are electrochemically combined with the oxidant. A flow of ions through the electrolyte completes the circuit.

Fuel cells may be categorized according to the type of electrolyte used. Four types of fuel cells are generally considered to be in the mainstream of the technology: alkaline fuel cells, acid fuel cells, molten carbonate fuel cells and solid electrolyte fuel cells.

Solid electrolyte fuel cells operate at high temperature and allow direct consumption of hydrocarbon fuels to provide a high power density. Solid electrolyte fuel cells also eliminate liquid electrolyte containment problems.

The use of ceria compositions as the electrolyte in solid electrolyte fuel cells is known, see, e.g., Tuller, H.L. and Nowick, A.S., "Doped Ceria as a Solid Oxide Electrolyte", Journal of the Electrochemical Society: Solid-State Science, Volume 122, No. 2,225 (February 1975). A ceria electrolyte offers a high ionic conductivity at temperatures in the range of 600 to 1000° C. However, in a reducing atmosphere such as that encountered on the hydrogen electrode side of the electrolyte, a conventional ceria electrolyte becomes an electronic as well as an ionic conductor, and allows short circuiting across the electrolyte. The short circuiting reduces the performance of the fuel cell.

What is needed in the art is a way to eliminate or reduce these losses so that ceria electrolyte compositions may find practical application in fuel cell power plants.

DISCLOSURE OF THE INVENTION

An electrolyte composition is disclosed. The composition comprises:

$Ce_xM_yD_zO_{2-d}$, wherein:

M is a primary dopant chosen from the group consisting of Pr,Nd,Pm,Sm,Eu,Gd,Tb,Dy,Ho,Er,Tm,Yb,-Lu,Sc,Y,La and Ca D is a secondary dopant chosen from the group consisting of Pr,Sm,Eu,Tb,Fe,Co and Ni,

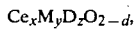

M is present in an amount mole fraction y, sufficient to increase the ionic conductivity of the composition, D is present in an amount, mole fraction z, sufficient to decrease the electronic conductivity of the composition under reducing conditions, and about $0.05 \leq d \neq$ about 0.30.

The composition of the present invention provides high ionic conductivity and low electronic conductivity under reducing conditions.

A fuel cell is disclosed. The fuel cell comprises an anode, a cathode, and a solid electrolyte between the anode and cathode, wherein the solid electrolyte comprises the composition described above.

A process for generating electricity is also disclosed. The process comprises providing a fuel cell, wherein the fuel cell comprises the fuel cell described above, supplying a fuel to the anode of the fuel cell, supplying an oxidant to the cathode side of the fuel cell, and electrochemically reacting the fuel and the oxidant to provide an electrical current.

DESCRIPTION OF THE PREFERRED EMBODIMENT

Figure 1:
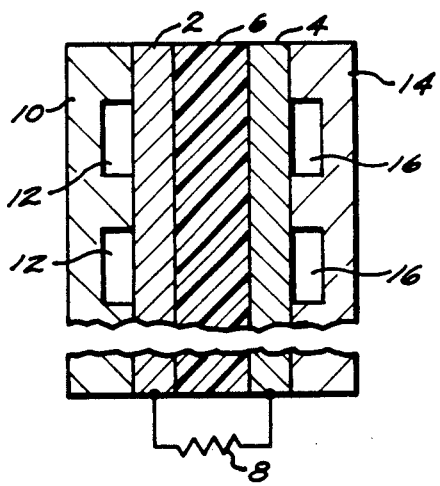
FIG. 1 shows a cross sectional view of a fuel cell of the present invention.

The ceria electrolyte composition of the present invention comprises:

$Ce_xM_yD_zO_{2-d}$, wherein:

M is a primary dopant chosen from the group consisting of Pr,Nd,Pm,Sm,Eu,Gd,Tb,Dy,Ho,Er,Tm,Yb,-Lu,Sc,Y,La and Ca, D is a secondary dopant chosen from the group consisting of Pr,Sm,Eu,Tb,Fe,Co and Ni, $M \neq D$, and x, y, z and 2−d are coefficients denoting the atomic fractions of the respective components and fall within the ranges set out below.

The primary dopant is chosen to increase the ionic conductivity of the electrolyte relative to ceria compositions lacking the primary dopant. Suitable primary dopants are known in the art. Preferably, the primary dopant, M, is chosen from the group consisting of Gd, Y, Ca, Sm, La, Nd and Sc. More preferably, M comprises Gd, Sm, Ca or Y. Most preferably, M comprises Gd.

The secondary dopant, D, is chosen to decrease the electronic conductivity of the electrolyte composition under reducing conditions, relative to the electronic conductivity of ceria compositions lacking the secondary dopant. Suitable secondary dopants, D, comprise elements which reduce more easily than Ce. Preferably, the secondary dopant has an ionic radius similar to that of Ce. Most preferably, D comprises Pr or Sm.

Specific examples of the composition of the present invention include:

$Ce_xGd_yPr_zO_{2-d}$,
$Ce_xGd_ySm_zO_{2-d}$,
$Ce_xGd_yEu_zO_{2-d}$,
$Ce_xGd_yTb_zO_{2-d}$,
$Ce_xGd_yFe_zO_{2-d}$,
$Ce_xGd_yCo_zO_{2-d}$,
$Ce_xGd_yNi_zO_{2-d}$,
$Ce_xY_yPr_zO_{2-d}$,
$Ce_xY_ySm_zO_{2-d}$,
$Ce_xY_yEu_zO_{2-d}$,
$Ce_xY_yTb_zO_{2-d}$,
$Ce_xY_yFe_zO_{2-d}$,
$Ce_xY_yCo_zO_{2-d}$,
$Ce_xY_yNi_zO_{2-d}$,
$Ce_xCa_yPr_zO_{2-d}$,
$Ce_xCa_ySm_zO_{2-d}$,
$Ce_xCa_yEu_zO_{2-d}$,
$Ce_xCa_yTb_zO_{2-d}$,
$Ce_xCa_yFe_zO_{2-d}$,
$Ce_xCa_yCo_zO_{2-d}$,
$Ce_xCa_yNi_zO_{2-d}$,
$Ce_xSm_yPr_zO_{2-d}$,
$Ce_xSm_yEu_zO_{2-d}$,
$Ce_xSm_yTb_zO_{2-d}$,
$Ce_xSm_yFe_zO_{2-d}$,
$Ce_xSm_yCo_zO_{2-d}$,
and $Ce_xSm_yNi_zO_{2-d}$;

wherein x,y,z and d are within the ranges set out below.

The atomic fraction of Ce, x, is within the range of about 0.7 to about 0.9 and preferably falls within the range of about 0.75 to about 0.85.

The atomic fractions of the primary dopant, y, and the atomic fraction of the secondary dopant, z, are chosen to the maximize ionic conductance of the electrolyte and minimize the electronic conductance of the electrolyte under reducing conditions. The atomic fraction of primary dopant in the present composition, y, is preferably within the range of about 0.1 to about 0.3 and most preferably falls within the range from about 0.15 to about 0.25. The atomic fraction of secondary dopant in the present composition, z, is preferably within the range of about 0.001 to about 0.1 and most preferably falls within the range of about 0.01 to about 0.05.

The atomic fraction of oxygen in the present composition, $2-d$, varies with the oxidation states of the primary and secondary dopants, with atomic fractions y and z and with oxygen partial pressure. An oxygen vacancy is formed for each divalent dopant atom, one half of an oxygen vacancy is formed for each trivalent dopant atom and no oxygen vacancy is formed for each quadravalent dopant atom. The atomic fraction of oxygen in the composition of the present invention typically ranges from about 1.7 to about 1.95 and most typically ranges from about 1.895 to about 1.9. Values for d may therefore typically range from 0.05 to about 0.30 and most typically range from 0.1 to 0.105.

The ceria electrolyte of the present invention may be made by conventional solid state techniques. Inorganic precursor materials are mixed and reacted to form a product of the desired composition. Precursor materials comprise compounds which decompose under suitable conditions to yield reactants which are then reacted to form the ceria electrolyte product. The relative amount of each precursor material in the mixture is chosen to provide a product having the desired molar composition.

In a preferred process, stoichiometric amounts of water soluble inorganic precursor materials are combined to form an aqueous solution. Reactants are precipitated from the solution. The precipitate is filtered, dried and ground to form a fine powder. The powder is then calcined in air. The calcined powder is pressed and sintered to form the ceria electrolyte composition.

The ceria electrolyte of the present invention is used as the electrolyte in a solid electrolyte fuel cell. A solid electrolyte fuel cell of the present invention is shown in FIG. 1 and comprises an anode 2, a cathode 4 and a ceria electrolyte 6 of the present invention between the anode 2 and cathode 4, an external circuit 8 electrically connecting the anode 2 and the cathode 4, a first flow field 10 having passages 12 for directing reactants to and reaction products away from the anode 2, and a second flow field 14 having passages 16 for directing reactants to and reaction products from the cathode 4.

The fuel cell is operated at pressures between 1 and 10 atm and temperatures between 600° C.–1000° C. to generate an electrical current by electrochemically reacting the fuel and oxidant streams. Key fuel cell performance parameters include current density, cell voltage, and power density and cell efficiency.

Current density is defined as the current generated per unit cross sectional area of the electrolyte expressed in milliamps/square centimeter ($mA/cm^2$). Cell voltage is defined as the voltage generated by the cell expressed in volts (V). Power density is defined as the power generated per unit cross sectional area of the electrolyte, expressed as watts/square centimeter ($w/cm^2$). Cell efficiency is defined as DC power produced/standard enthalpy of fuel electrochemically converted.

The electrolyte composition of the present invention provides high ionic conductance but exhibits low electronic conductivity at low $O_2$ partial pressures. Preferably, the electrolyte of the present invention exhibits an electronic conductivity of less than about 0.3 S/cm at an $O_2$ partial pressure of about $1 \times 10^{-23}$ atm. The behavior of the electrode of the present invention with regard to $O_2$ partial pressure may be characterized by reference to an electrolytic domain boundary value. The electrolytic domain boundary is defined as the $O_2$ partial pressure at which the electronic conductivity of the electrolyte equals the ionic conductivity of the electrolyte. Preferably, the electrolyte of the present invention exhibits an electrolytic domain boundary of less than about $5 \times 10^{-19}$ atm $O_2$ at 700 ° C. Most preferably, the electrolyte of the present invention exhibits an electrolytic domain boundary of less than about $5 \times 10^{-20}$ atm $O_2$ at 700° C. The low electrolytic domain boundary of the electrolyte provides performance advantages to fuel cells in which the electrolyte is employed. Since the electrolyte of the present invention provides low electronic conductivity and high ionic conductivity at low $O_2$ partial pressures, short circuiting across the electrolyte is reduced. Power and efficiency losses which result from short circuiting are correspondingly reduced.

The basis for the electronic conductivity of a conventional ceria electrolyte appears to be a departure from stoichiometry in the ceria as it is reduced under low $O_2$ partial Pressures.

The reaction may be expressed as:

$$O_o = V_o + 2e + \tfrac{1}{2} O_2(gas),$$

where:

$O_o$ is an oxygen site in the ceria electrolyte, and
$V_o$ is a vacant positively charged site in the ceria electrolyte.

Reduction converts an oxygen to a vacant site plus two free electrons. Movement of the free electrons through the electrolyte provides the mechanism for internal short circuiting of the electrolyte.

While not wishing to be bound by any particular theory, it is believed that the secondary dopant, D, of the composition of the present invention minimizes the electronic conductivity of the composition by trapping electrons, i.e. by reducing the net total of mobile electrons in the composition.

EXAMPLE 1

52.11 grams Ce(NO$_3$)$_3$ 6H$_2$O, 10.56 grams Gd(NO$_3$)$_2$ and 0.65 grams Pr(NO$_3$) were combined, dissolved in distilled water and diluted to form a 0.3M nitrate solution. The nitrate solution was added dropwise to a bath of 0.3M ammonium oxalate to precipitate the Ce, Gd and Pr reactants. Additions of 10% NH$_4$OH were made to maintain the pH between 6.5 and 7.0. After all the nitrate solution had been added to the bath, additional NH$_4$OH is added to raise the pH of the solution to 7.5 to ensure complete precipitation. The precipitate was filtered, oven dried at 140° C. and crushed in a porcelain mortar and pestle to form a fine powder. The powder was calcined in an alumina crucible in air at 750° C. for 16 hours. The calcined powder was mixed with 0.3 wt. % polyvinyl alcohol as a binder. The mixture was pressed at 200MPa, crushed, reground and finally repressed at 400MPa to form wafers. The wafers were sintered at temperatures between 1300° C. and 1525° C. to form wafers having a nominal composition of Ce$_{0.8}$Gd$_{0.19}$Pr$_{0.01}$O$_{2-d}$.

Wafers having a nominal composition:

$$Ce_{0.8}Gd_{0.2}O_{2-d}$$

were also prepared by a process analogous to the process described above.

Figure 2:
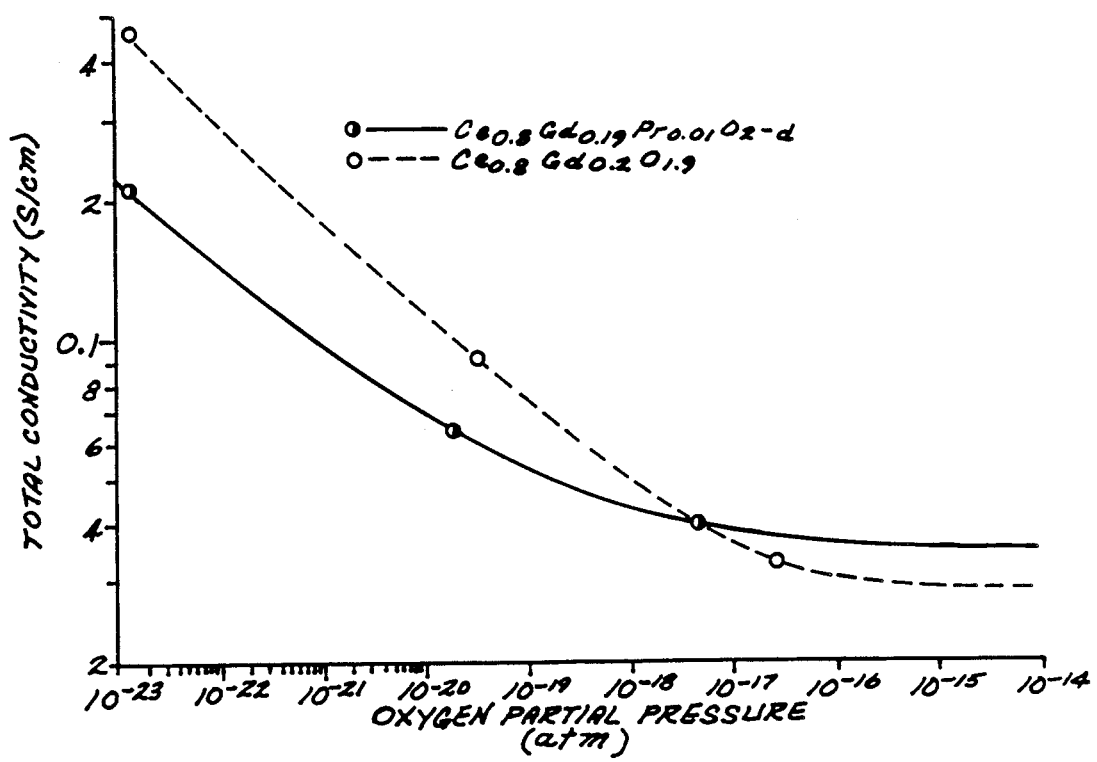
FIG. 2 shows a plot of log total conductivity as a function of oxygen partial pressure.

Conductivity measurements were made using the A.C. impedence technique. FIG. 2 shows total conductivity (S/cm) of each composition as a function of O$_2$ partial pressure (atm) at 700° C. The electrolytic domain boundary of the Ce$_{0.8}$Gd$_{0.2}$O$_{1.9}$ composition was about O$_2$. The electrolytic domain boundary of the Ce$_{0.8}$Gd$_{0.19}$Pr$_{0.01}$O$_{2-d}$ composition was $4.6 - 10^{-21}$ atm O$_2$

EXAMPLE 2

Wafers having nominal compositions:
Ce$_{0.8}$Gd$_{0.2-z}$Pr$_z$O$_{2-d}$ and
Ce$_{0.8}$Gd$_{0.2-z}$Sm$_z$O$_{2-d}$,
where:

$0 \leq z \leq 0.06$ and
$0.07 \leq d \leq 0.1$ were prepared by processes analogous to the process described in Example 1.

Figure 3:
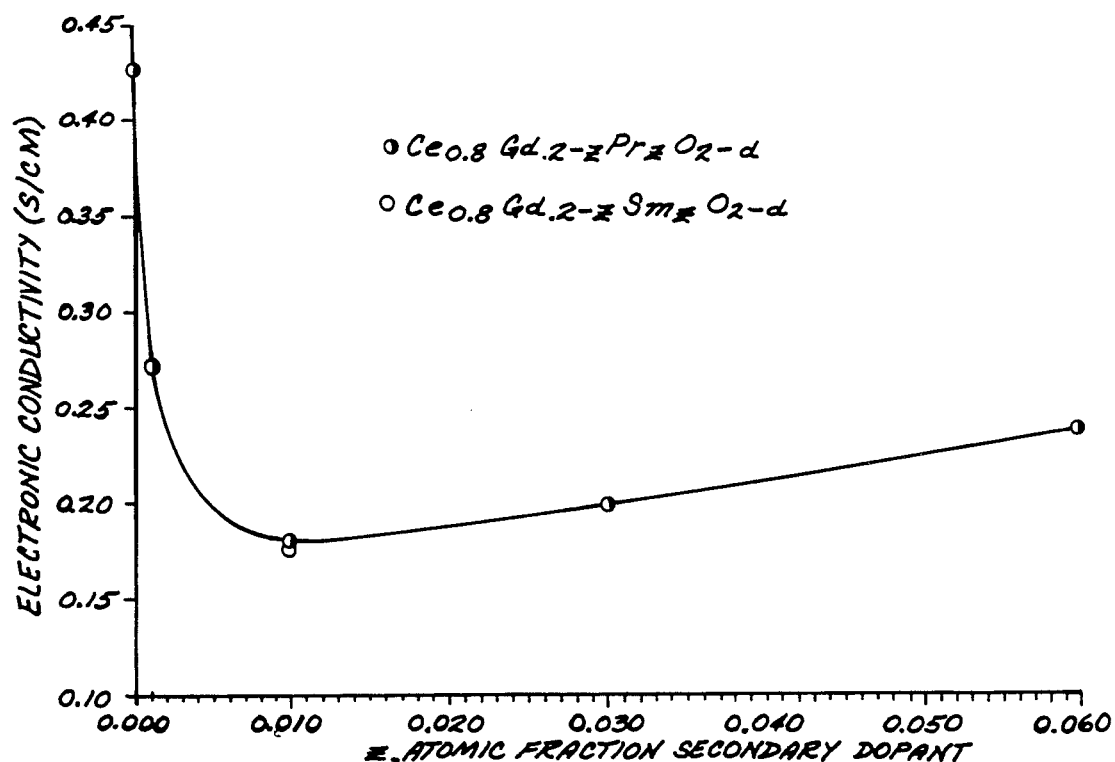
FIG. 3 shows a plot of electronic conductivity vs. secondary dopant level for a number of electrolyte compositions.

FIG. 3 shows a plot of electronic conductivity under reducing conditions (P$_{O2}$ = 1 × 10$^{-23}$ atm) versus atomic fraction of secondary dopant for the above described wafers at 700° C.

With regard to the Ce$_{0.8}$Gd$_{0.2-z}$Pr$_z$O$_{2-d}$ compositions, the electronic conductivity reaches a minimum of about 0.18 S/cm at a mole fraction Pr of about 0.010. The results obtained using Sm as a secondary dopant were in agreement with those obtained using Pr as the secondary dopant.

Figure 4:
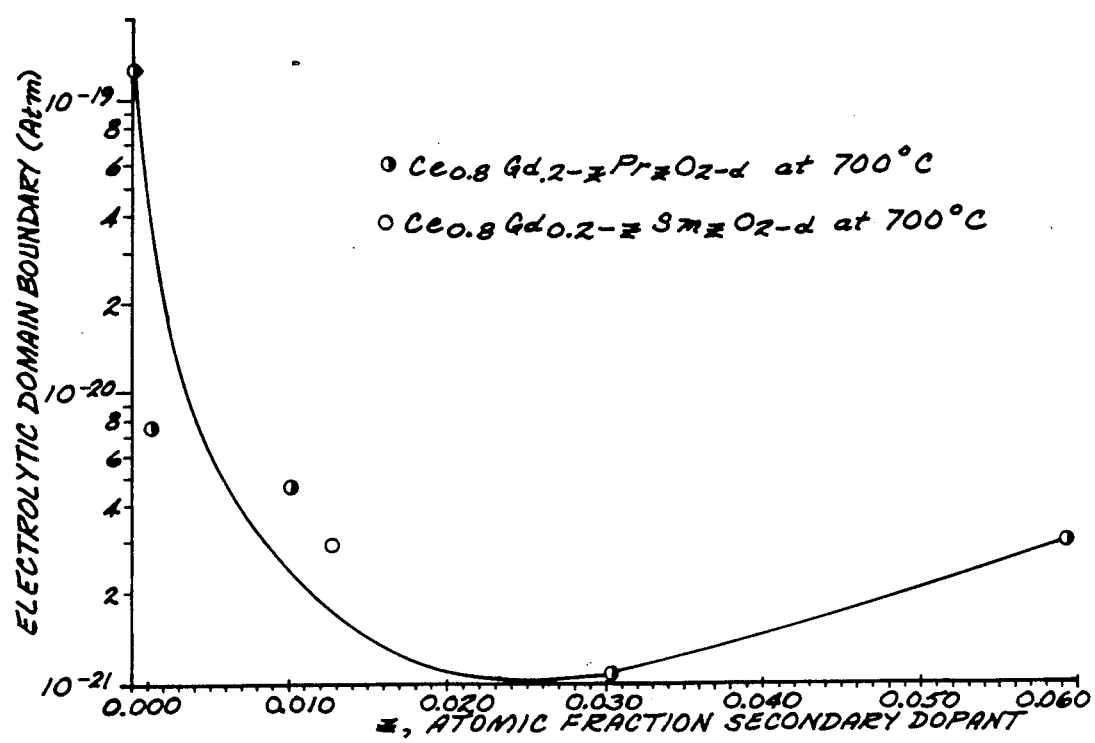
FIG. 4 shows a plot of electrolytic domain boundary vs. secondary dopant level for a number of electrolyte compositions.

FIG. 4 shows a plot of electronic domain boundary (atm O$_2$) versus atomic fraction of secondary dopant for the above described wafers at 700° C. The electronic domain boundary of the Ce$_{0.8}$Gd$_{2-x}$Pr$_x$O$_{2-d}$ compositions, fell below about $5 \times 10^{-19}$ atm for atomic fractions of Pr of greater than about 0.001. The results obtained using Sm as the secondary dopant were in agreement with those using Pr as the secondary dopant.

EXAMPLE 3

The conductivity data collected in Example 1 were used to calculate the performance of fuel cells using each of the electrolyte compositions. The calculations were based on a fuel cell having a 0.005 inch thick electrolyte layer operated at 710° C. with negligible electrode losses. The method of calculation is conventional in the art, e.g. see generally, P.N. Ross, Jr. and T.G. Benjamin, "Thermal Efficiency of Solid Electrolyte Fuel Cells with Mixed Conduction", Journal of Power Sources 1 (1976/77) 311-321.

Figure 5:
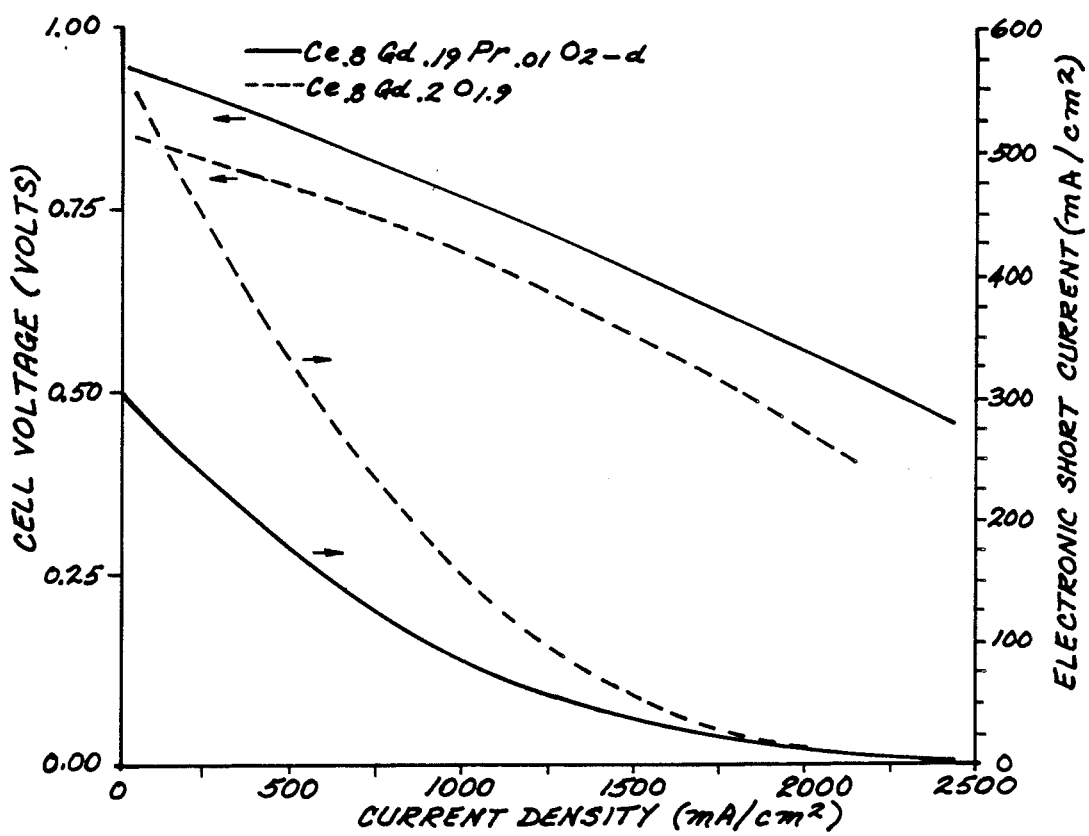
FIG. 5 shows a plot of fuel cell voltage and electronic short circuit current vs. current density for two electrolyte compositions.

FIG. 5 shows a plot of calculated cell voltage and calculated electronic short circuit current versus current density at 710° C. A fuel cell having an electrolyte of the present invention exhibits an electronic short circuit current that is substantially lower than the short circuit current exhibited by fuel cell having a Ce$_{0.8}$Gd$_{0.2}$O$_{2-d}$ electrolyte at current densities less than 2000 mA/cm$^2$.

Figure 6:
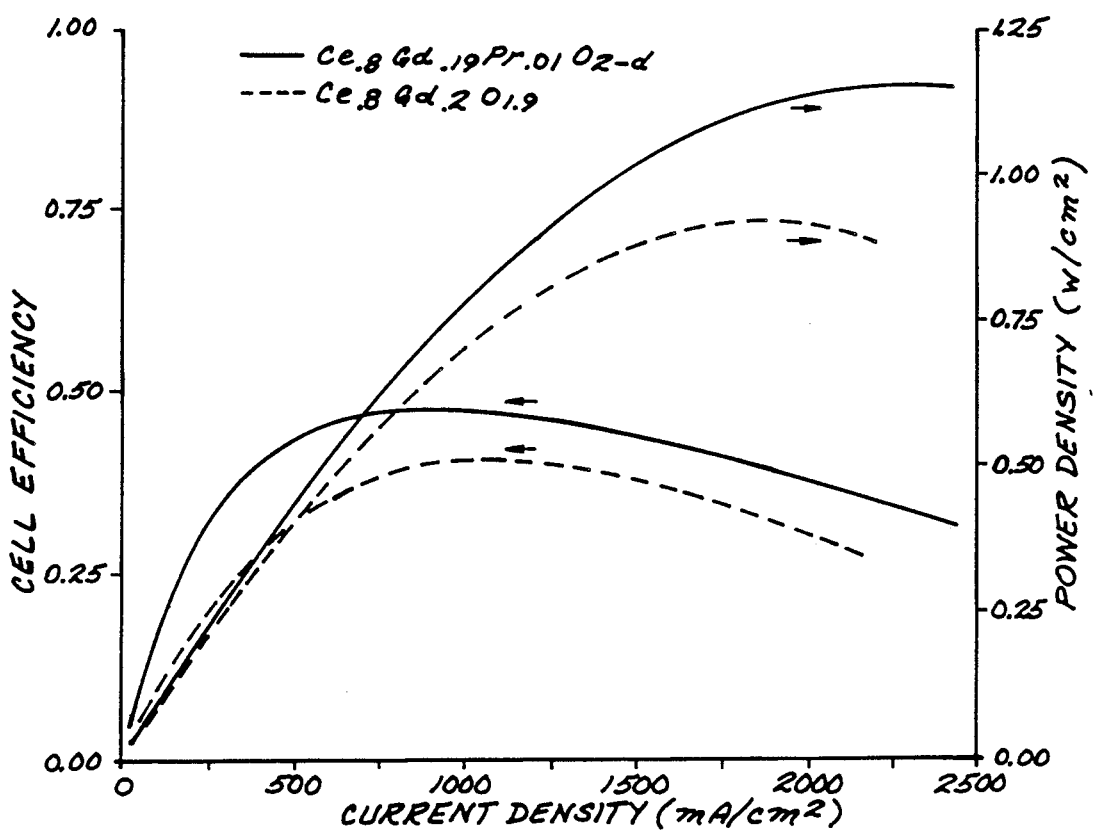
FIG. 6 shows a plot of cell efficiency and power density vs current density for two electrolyte compositions.

FIG. 6 shows a plot of calculated cell efficiency and calculated power density versus current density at 710° C A fuel cell having an electrolyte composition of the present invention exhibits a maximum cell efficiency of about 0.48 at an current density of about 750A/cm$^2$, while a cell having a Ce$_{0.8}$Gd$_{0.2}$O$_{2-d}$ electrolyte exhibits a maximum cell efficiency of about 0.4 at a current density of about 1000 mA/cm$^2$.

A fuel cell having an electrolyte of the present invention exhibits a maximum power density of about 1.2 w/cm$^2$ at a current density of about 2400 mA/cm$^2$ at 710° C., while a fuel cell having Ce$_{0.8}$Gd$_{0.2}$O$_{2-d}$ electrolyte exhibits a maximum power density of about 0.9 w/cm$^2$ at a current density of about 2000 mA/cm$^2$ at 710° C.

The electrolyte composition of the present invention provides high ionic conductivity and reduced electronic conductivity under low oxygen partial pressures. Fuel cells employing the electrolyte composition of the present invention will exhibit improved efficiency and higher power density relative to fuel cells employing conventional ceria electrolyte compositions, due to a reduction in short circuiting between the electrodes of the fuel cell.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrolyte composition, comprising:

$$Ce_xM_yD_zO_{2-d},$$

wherein:
M is chosen from the group consisting of Pr,Nd,Pm,Sm,Eu,Gd,Tb,Dy,Ho,Er,Tm,Yb,Lu,Sc,Y,La and Ca,
D is chosen from the group consisting of Pr,Sm,Eu,Tb,Fe,Co and Ni,
$M \neq D$,
M is present in an amount, mole fraction y, effective to increase the ionic conductivity of the composition,
D is present in an amount, mole fraction z, effective to decrease the electronic conductivity of the composition under reducing conditions, and about $0.05 \leq d \leq$ about 0.30.

2. The composition of claim 1, wherein the composition exhibits an electrolytic domain boundary of less than $3 \times 10^{-19}$ atm $O_2$ at about 700° C.

3. The composition of claim 1, wherein the composition exhibits an electronic conductivity of less than 0.8 S/cm at an oxygen partial pressure of less than $3 \times 10^{-19}$ atm $O_2$ at about 700° C.

4. The composition of claim 1, wherein:
M is chosen from the group consisting of Gd,Y,Ca,Sm,La,Nd and Sc;

5. The composition of claim 4, wherein:
M is chosen from the group consisting of Gd,Sm,Ca and Y, and
D is chosen from the group consisting of Pr and Sm.

6. The composition of claim 1, wherein:
about $0.7 \leq x \leq$ about 0.9,
about $0.1 \leq y \leq$ about 0.3,
about $0.001 \leq z \leq$ about 0.1, and
about $0.1 \leq d \leq$ about 0.30

7. The composition of claim 6, wherein:
about $0.75 \leq x \leq$ about 0.85,
about $0.15 \leq y \leq$ about 0.25, and
about $0.01 \leq z \leq$ about 0.05.

8. A fuel cell, comprising:
an anode;
a cathode; and
a solid electrolyte between the anode and the electrolyte comprising:

$Ce_xM_yD_zO_{2-d}$, wherein:
M is chosen from the group consisting of Pr,Nd,Pm,Sm,Eu,Gd,Tb,Dy,Ho,Er,Tm,Yb,Lu,Sc,Y,La and Ca,
D is chosen from the group consisting of Pr,Sm,Eu,Tb,Fe,Co and Ni, $M \neq D$, M is present in an amount, mole fraction y, effective to increase the ionic conductivity of the composition,
D is present in an amount, mole fraction z, effective to decrease the electronic conductivity of the composition under reducing conditions, and about $0.05 \leq d \leq$ about 0.30.

9. The fuel cell of claim 8, wherein the fuel cell exhibits improved power density and efficiency.

10. The fuel cell of claim 9, wherein:
M is chosen from the group consisting of Gd,Y,Ca,Sm,Th,La,Nd and Sc;

11. The fuel cell of claim 8, wherein:
M is chosen from the group consisting of Gd,Sm,Ca and Y, and
D is chosen from the group consisting of Pr and Sm.

12. The fuel cell of claim 8, wherein:
about $0.7 \leq x \leq$ about 0.9,
about $0.1 \leq y \leq$ about 0.3,
about $0.001 \leq z \leq$ about 0.1, and
about $0.001 \leq z \leq$ about 0.30.

13. A method for generating electricity, comprising:
providing a fuel cell, said fuel cell comprising:
an anode;
a cathode; and
a solid electrolyte between the anode and the cathode,
said electrolyte comprising:

$Ce_xM_yD_zO_{2-d}$, wherein:
M is chosen from the group consisting of Pr,Nd,Pm,Sm,Eu,Gd,Tb,Dy,Ho,Er,Tm,Yb,Lu,Sc,Y,La and Ca,
D is chosen from the group consisting of Pr,Sm,Eu,Tb,Fe,Co and Ni, $M \neq D$, M is present in an amount, mole fraction y, effective to increase the ionic conductivity of the composition,
D is present in an amount, mole fraction z, effective to decrease the electronic conductivity of the composition under reducing conditions, and about $0.05 \leq d \leq$ about 0.30;
supplying a fuel gas to the anode;
supplying an oxidant gas to the cathode; and
electrochemically reacting the fuel gas and the oxidant gas in the fuel cell at a temperature between about 600° C. and about 1000° C. and a pressure between about 1 atm and 10 atm to produce electricity.

14. The method of claim 13, wherein:
M is chosen from the group consisting of Gd,Y,Ca,Sm,Th,La,Nd and Sc;

15. The method of claim 13, wherein:
M is chosen from the group consisting of Gd,Sm,Ca and Y, and
D is chosen from the group consisting of Pr and Sm.

16. The method of claim 13, wherein:
about $0.7 \leq x \leq$ about 0.9,
about $0.1 \leq y \leq$ about 0.3,
about $0.001 \leq z \leq$ about 0.1, and
about $0.1 \leq d \leq$ about 0.30.

* * * * *

UNITED STATES PATENT AND TRADEMARK OFFICE
CERTIFICATE OF CORRECTION

PATENT NO. : 5,001,021
DATED : March 19, 1991
INVENTOR(S) : Donald L. Maricle et al It is certified that error appears in the above-indentified patent and that said Letters Patent is hereby corrected as shown below:

Col. 1, line 5, Insert the following paragraph:

This invention was made with Government support under Grant Number N00014-88-C-0390 awarded by the Department of the Navy. The Government has certain rights in the invention.

Signed and Sealed this

Twenty-eighth Day of March, 2000

Attest:

Q. TODD DICKINSON

Attesting Officer

Commissioner of Patents and Trademarks